UNITED STATES PATENT OFFICE.

ISAAC GORDON, OF CHELSEA, MASSACHUSETTS.

COMPOSITION FOR FIREPROOFING PAPER.

SPECIFICATION forming part of Letters Patent No. 671,548, dated April 9, 1901.

Application filed December 22, 1900. Serial No. 40,781. (No specimens.)

*To all whom it may concern:*

Be it known that I, ISAAC GORDON, a citizen of the United States, residing at Chelsea, in the county of Suffolk and Commonwealth of Massachusetts, have invented a new and useful Composition of Matter to be Applied to Paper to Render the Paper Fireproof and Durable, of which the following is a specification.

As is well known, the coating of paper with various chemicals has already been the subject of extensive investigation, experiments, and numerous patents; but this invention has for its object the production of a new composition for fireproofing of paper or cardboard by bringing together certain substances well known in chemistry, as hereinafter described.

I am aware that two of the ingredients of my composition have been used for the same purpose; but I am not aware that all of the ingredients (nor a composition of any three of them) have been used together for this purpose.

My composition consists of the following ingredients, combined in the proportions stated, viz: silicate of soda, one gallon; caustic soda (sodium hydroxid) NaOH, ten pounds; sal-soda (sodium carbonate) $Na_2CO_3.10H_2O$, five pounds; water (substantially pure) $H_2O$, one gallon; rock-salt (sodium chlorid) NaCl, ten pounds.

In carrying out my invention I first take the caustic soda or sodium hydroxid and the rock-salt or sodium chlorid and mix and steam them together, keeping this mixture well stirred while steaming. When thoroughly steamed, mix with the silicate of soda. The sal-soda or sodium corbonate after being heated to form a liquid is then thoroughly mingled with them by agitation.

In the using of sodium chlorid rock-salt is preferable to table-salt, and in the heating and liquefying of the sodium carbonate it is best to have the sodium carbonate resting upon a screen suspended over the kettle containing the mixture of the other four ingredients and allowed to drop into this mixture as it melts. The paper to be treated can be coated with this mixture; but it is best to macerate or thoroughly soak it in this composition, after which it can be hung to dry in a warm place. After being partly dried, if a gloss coating is desired a small amount of silicate of soda may be applied to the sides of the paper.

What I claim, and desire to secure by Letters Patent of the United States, is—

1. The herein-described composition of matter, consisting of silicate of soda, sodium hydroxid, sodium carbonate, water and sodium chlorid, substantially as described and for the purposes specified.

2. The herein-described composition of matter for strengthening and preparing paper to render it fireproof and durable, consisting substantially of the following ingredients, silicate of soda one gallon, caustic soda ten pounds, sal-soda five pounds, rock-salt ten pounds, and water one gallon.

In testimony whereof I have signed my name to this specification in the presence of two subscribing witnesses.

ISAAC GORDON.

Witnesses:
CHARLES F. A. SMITH,
SOLOMON A. WELLINGTON.